(12) United States Patent
Seki

(10) Patent No.: US 10,613,605 B2
(45) Date of Patent: Apr. 7, 2020

(54) SERVICE DEVICE, POWER SUPPLY CONTROL METHOD, PROGRAM, EXTERNAL POWER SUPPLY DEVICE, AND SERVER SYSTEM

(71) Applicant: NEC Corporation, Tokyo (JP)

(72) Inventor: Hideki Seki, Tokyo (JP)

(73) Assignee: NEC Corporation, Tokyo (JP)

( * ) Notice: Subject to any disclaimer, the term of this patent is extended or adjusted under 35 U.S.C. 154(b) by 45 days.

(21) Appl. No.: 15/459,377

(22) Filed: Mar. 15, 2017

(65) Prior Publication Data

US 2017/0269656 A1  Sep. 21, 2017

(30) Foreign Application Priority Data

Mar. 17, 2016 (JP) .................. 2016-053923

(51) Int. Cl.
 *G06F 1/26* (2006.01)
 *G06F 11/20* (2006.01)

(52) U.S. Cl.
 CPC ............ *G06F 1/26* (2013.01); *G06F 11/2015* (2013.01)

(58) Field of Classification Search
 CPC ............... G06F 1/26; G06F 1/263; G06F 1/30
 See application file for complete search history.

(56) References Cited

U.S. PATENT DOCUMENTS

| 9,829,516 | B1* | 11/2017 | Ernst | ..................... G01R 21/00 |
| 2009/0082910 | A1 | 3/2009 | Sato | |
| 2010/0306558 | A1* | 12/2010 | Kang | ........................ G06F 1/26 |
| | | | | 713/300 |
| 2012/0233361 | A1 | 9/2012 | Dalal et al. | |
| 2015/0039152 | A1* | 2/2015 | Uchikawa | ........... H02J 13/0096 |
| | | | | 700/297 |
| 2016/0233720 | A1* | 8/2016 | Lee | .......................... G06F 1/30 |

FOREIGN PATENT DOCUMENTS

| JP | 2001-224131 A | 8/2001 |
| JP | 2001-244131 A | 8/2001 |
| JP | 2003-264939 | 9/2003 |
| JP | 2007-280554 | 10/2007 |
| JP | 2008-140029 A | 6/2008 |
| JP | 2009-80597 A | 4/2009 |
| JP | 2013-500691 A | 1/2013 |

OTHER PUBLICATIONS

Japanese Office Action issued by the Japanese Patent Office in corresponding application No. JP 2016-053923, dated Sep. 24, 2019.

* cited by examiner

*Primary Examiner* — Austin Hicks

(74) *Attorney, Agent, or Firm* — Finnegan, Henderson, Farabow, Garrett & Dunner, L.L.P.

(57) ABSTRACT

A server device has an AC power supply unit configured to convert an AC voltage received from an AC power supply to a DC voltage, and a DC power supply input part configured to receive supply of a DC voltage outputted by an AC power supply unit of an external power supply device. The server device runs at a DC voltage supplied by at least one of the AC power supply unit and the DC power supply input part.

8 Claims, 8 Drawing Sheets

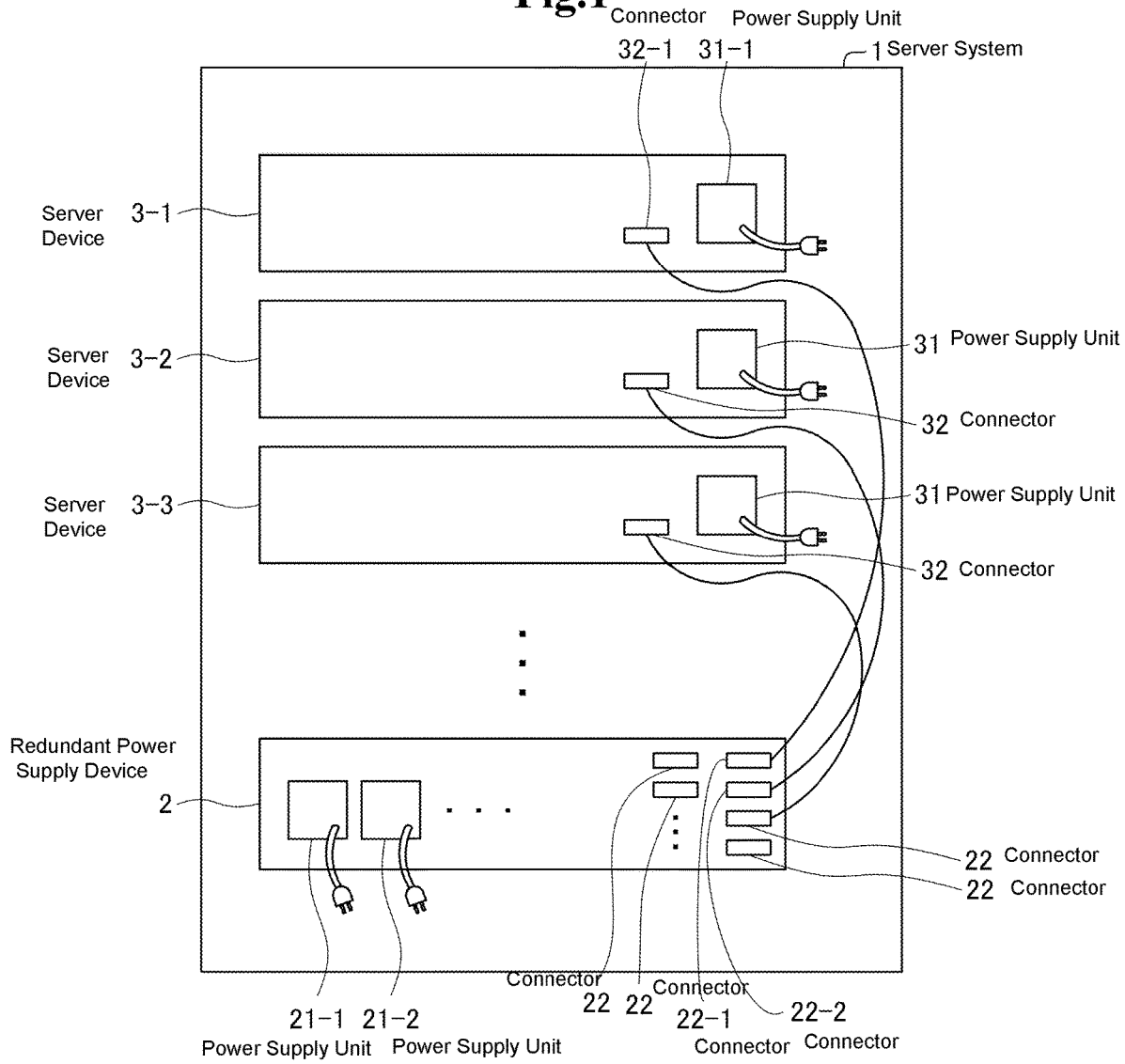

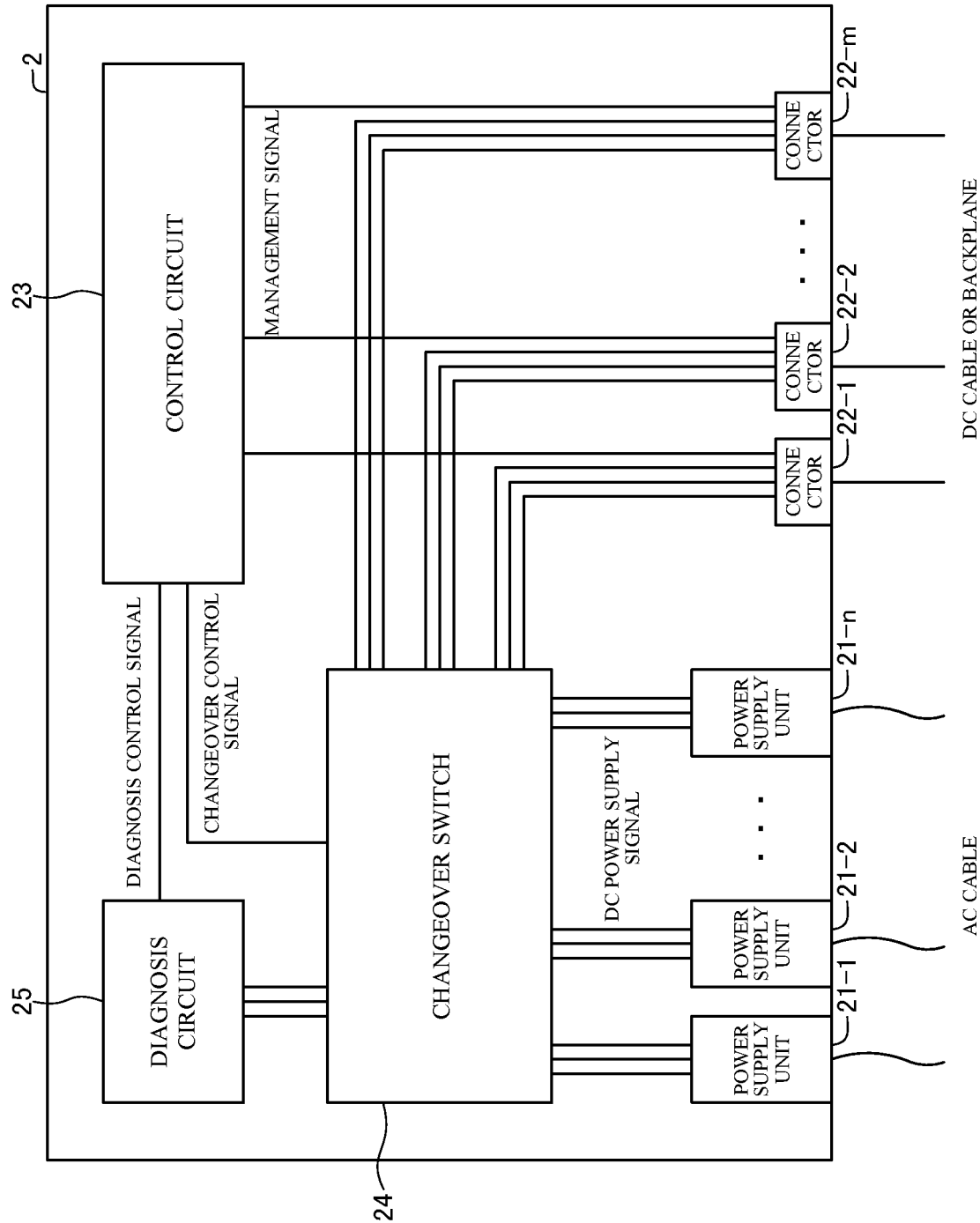

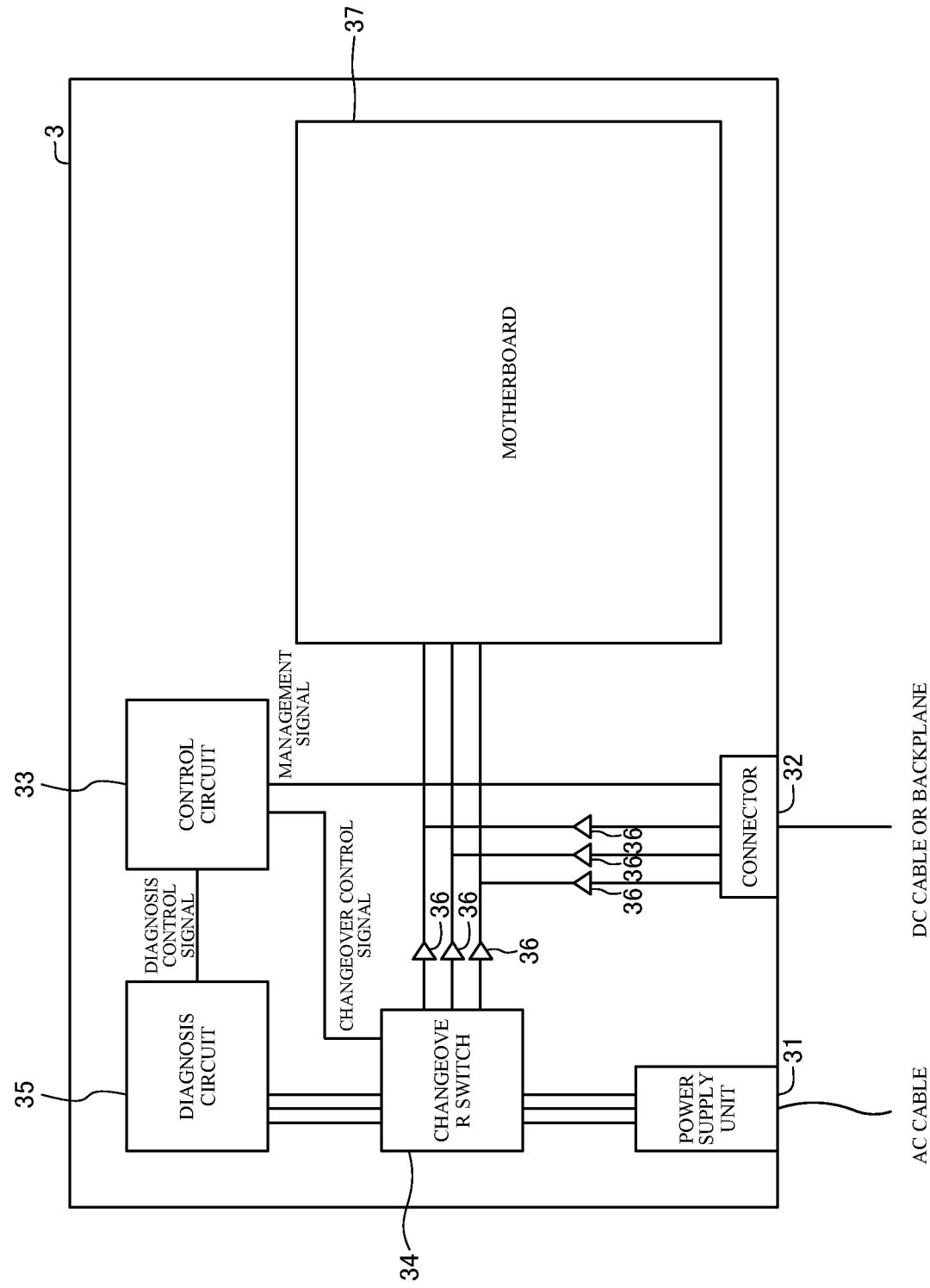

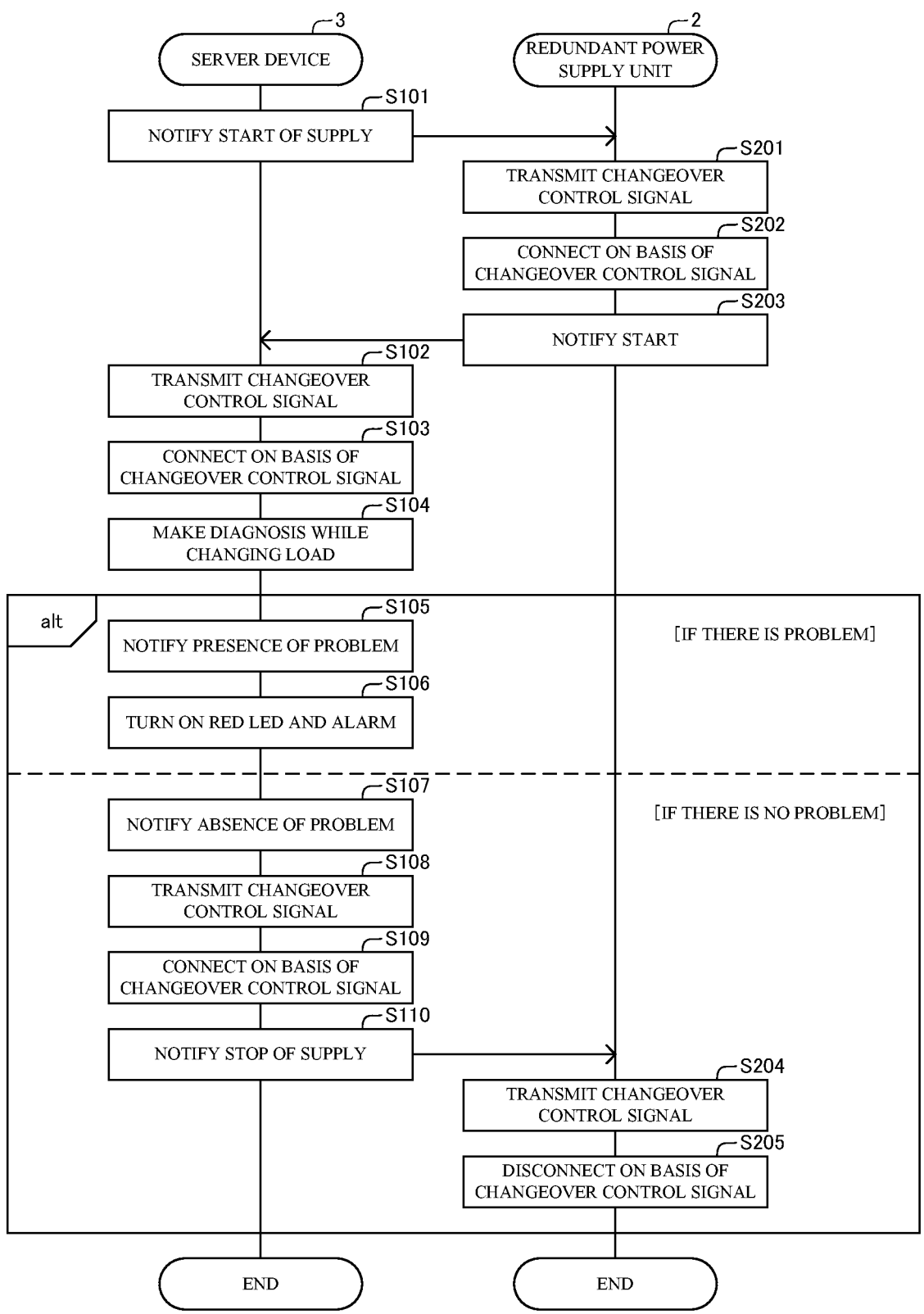

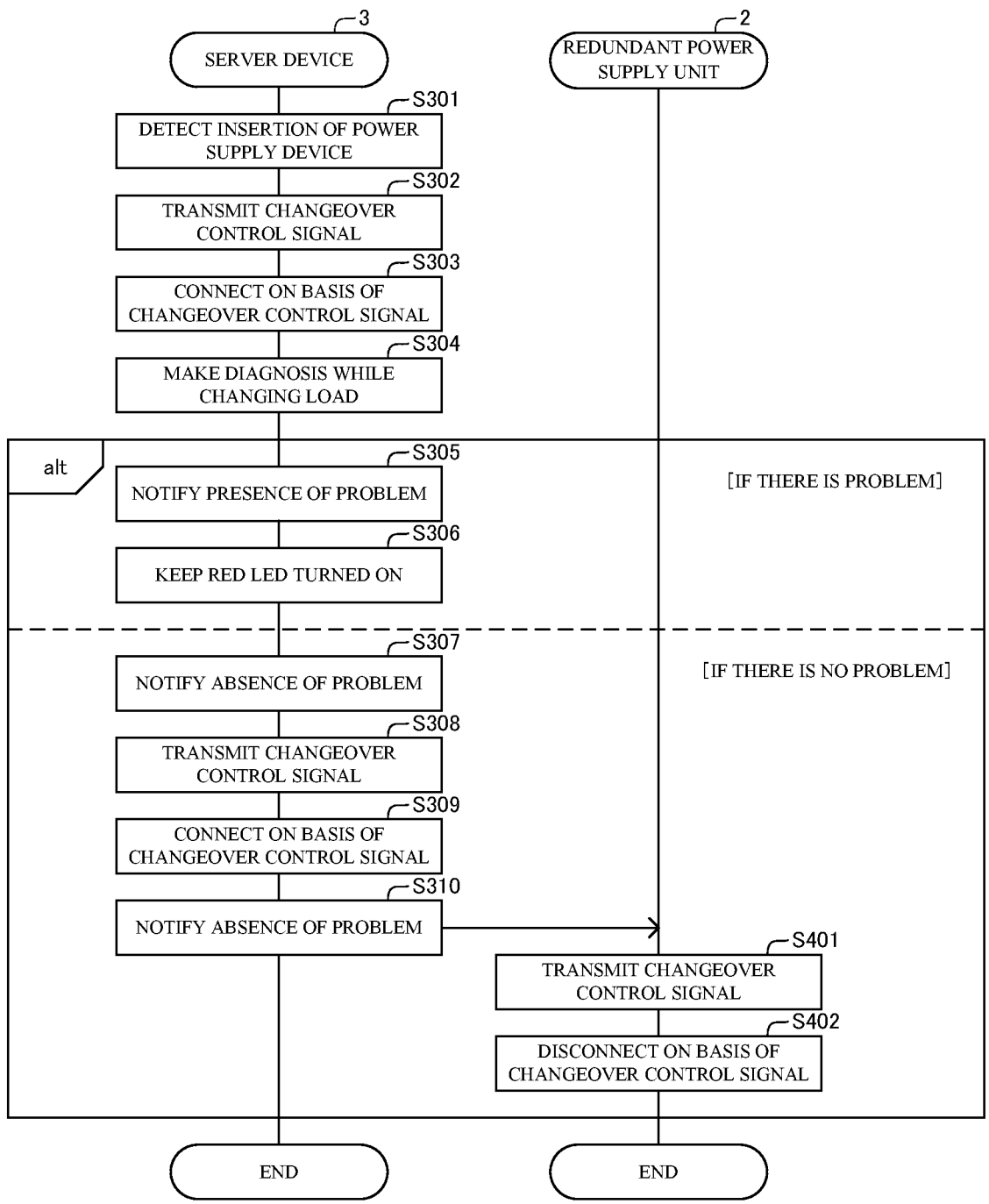

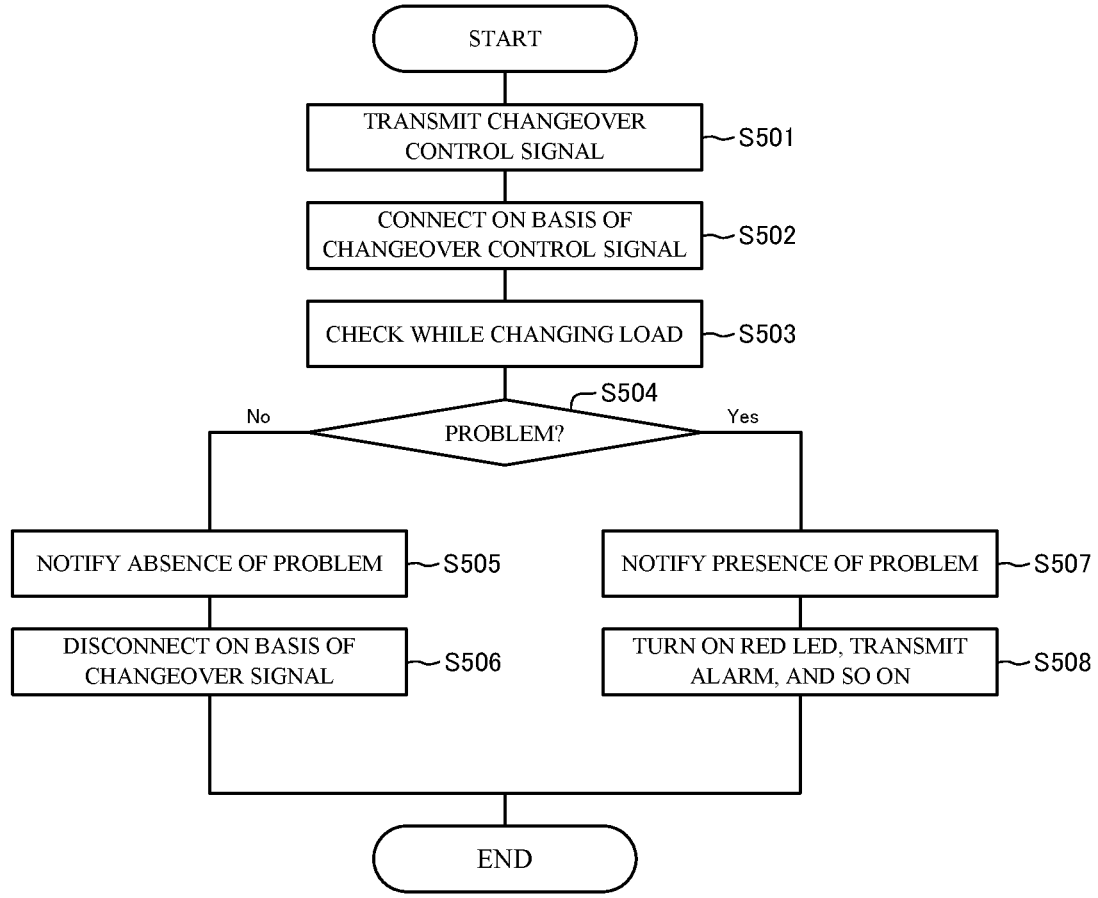
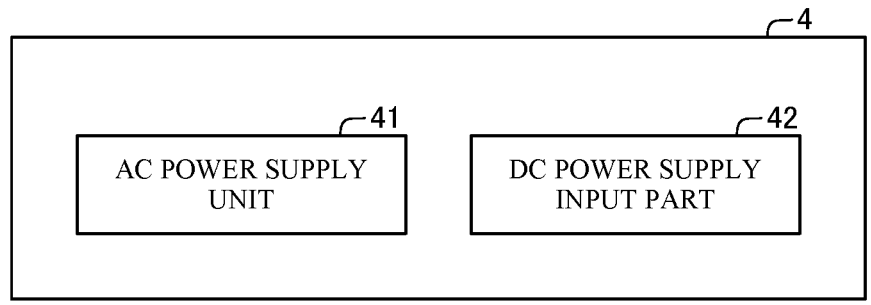

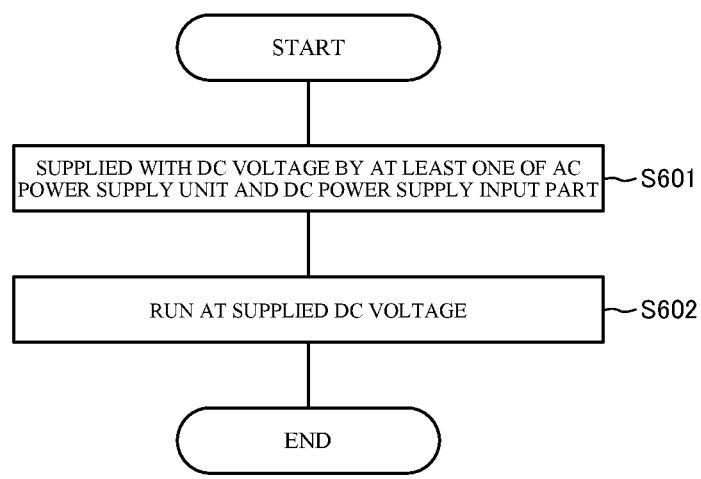
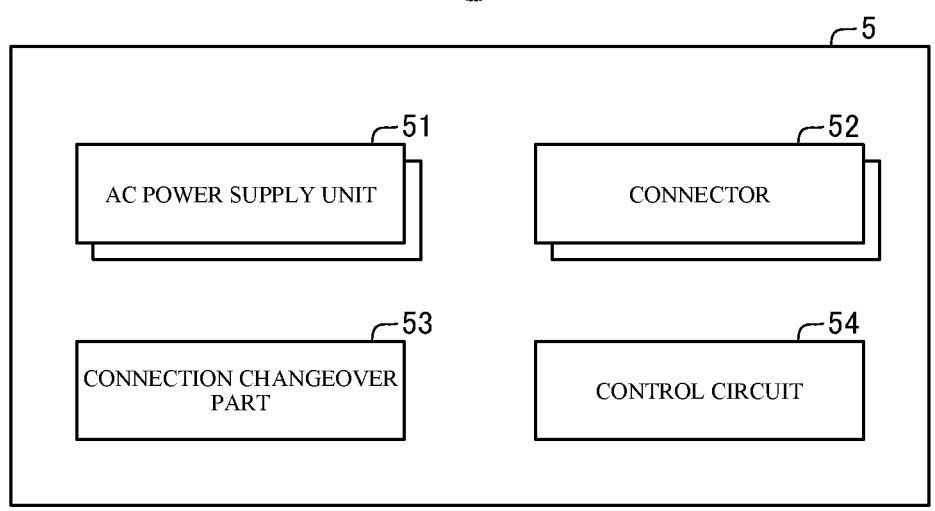

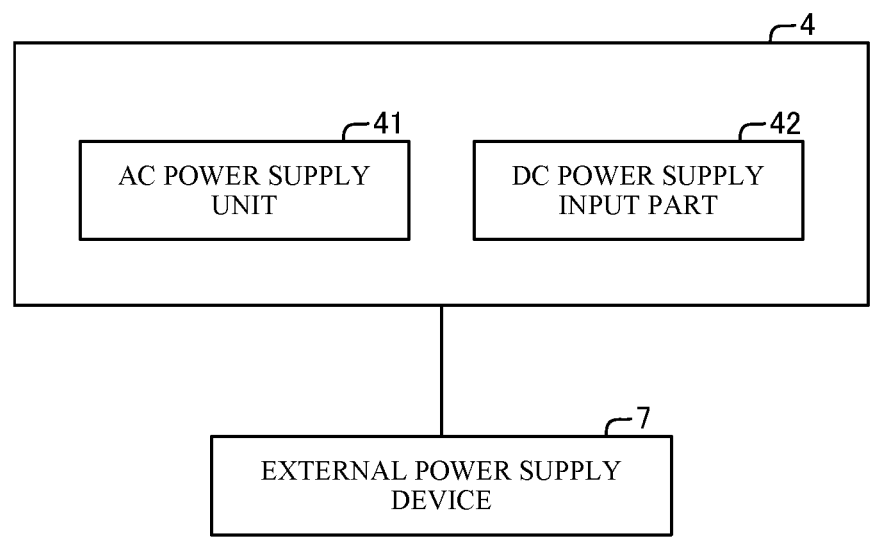

SERVICE DEVICE, POWER SUPPLY CONTROL METHOD, PROGRAM, EXTERNAL POWER SUPPLY DEVICE, AND SERVER SYSTEM

INCORPORATION BY REFERENCE

This application is based upon and claims the benefit of priority from Japanese patent application No. 2016-053923, filed on Mar. 17, 2016, the disclosure of which is incorporated herein in its entirety by reference.

TECHNICAL FIELD

The present invention relates to a server device, a power control method, a program, an external power supply device, and a server system. In particular, the present invention relates to a server device in which a power supply is redundant, a power control method, a program, an external power supply device, and a server system.

BACKGROUND ART

It is known to make a power supply redundant in a server device or the like in case of, for example, a failure of a power supply unit. As a technique to make a power supply redundant, for example, techniques described in Patent Documents 1 to 3 are known.

Patent Document 1 describes a storage device (a server device) which has two AC/DC (Alternating Current/Direct Current) power supply parts (power supply units) connected to different power supply paths, respectively. By thus equipping a storage device with a plurality of AC/DC power supply parts and making a power supply path redundant, it is possible to, even if a failure occurs on one of the paths, supply electric power via the other path that is normal. As a result, the storage device can normally run even if a failure occurs on one of the power supply paths, for example, one of the AC/DC power supply parts.

Further, Patent Document 2 describes an information processing system which has an external power supply device and a plurality of system devices (server devices) supplied with DC power by the external power supply device. According to Patent Document 2, the external power supply device has a plurality of power supply modules each including an AC/DC converter converting an AC power input to a DC power input, a battery outputting DC, and a unit to select and output either a DC output by the AC/DC converter or a DC output by the battery. Moreover, in the case described in Patent Document 2, for example, n+1 pieces of power supply modules are provided for n pieces of system devices. According to Patent Document 2, by thus making a power supply module redundant, it is possible to, even if a failure occurs in any of the power supply modules, replace the power supply module and return to the original status without stopping the system device.

Patent Document 1: Japanese Unexamined Patent Application Publication No. JP-A 2007-280554
Patent Document 2: Japanese Unexamined Patent Application Publication No. JP-A 2003-264939

In a case where one server device has two AC/DC power supply parts as described in Patent Document 1, power supply devices (AC/DC power supply parts) twice as many as a server device are needed. However, it is quite rare that a plurality of power supply devices simultaneously break down in a server device in a rack, and it seems to be very useless in view of space, price and heat cooling to prepare a spare power supply device for each server in case of such a rare case. Thus, there is a problem of much waste in view of cost and so on in equipping one server device with two AC/DC power supply parts.

Further, in a case where a server device is configured to be supplied with power only from an external power supply device as described in Patent Document 2, the server device cannot be used alone. Therefore, use of the configuration of Patent Document 2 has a problem of lack of versatility.

As mentioned above, the techniques described in Patent Documents 1 and 2 have problems such as much waste and lack of versatility. Thus, a server device or the like has a problem of difficulty to employ a redundant power supply configuration which is economical, versatile and appropriate.

SUMMARY OF THE INVENTION

Accordingly, an object of the present invention is to provide a server device which solves a problem of difficulty to employ an appropriate redundant mechanism of a power supply device in a server device or the like.

In order to achieve the object, a server device as an aspect of the present invention includes:
an AC power supply unit configured to convert an AC voltage received from an AC power supply to a DC voltage; and
a DC power supply input part configured to receive supply of a DC voltage outputted by an AC power supply unit of an external power supply device.

The server device runs at a DC voltage supplied by at least one of the AC power supply unit and the DC power supply input part.

Further, a power supply control method as one of other aspects of the present invention is a power supply control method executed by a server device having an AC power supply unit configured to convert an AC voltage received from an AC power supply to a DC voltage and a DC power supply input part configured to receive supply of a DC voltage outputted by an AC power supply unit of an external power supply device. The server device runs at a DC voltage supplied by at least one of the AC power supply unit and the DC power supply input part.

The power supply control method includes stopping supply of a DC voltage by the AC power supply unit after instructing the external power supply device to start supply of a DC voltage.

Further, a program as one of the other aspects of the present invention is a program including instructions for causing a server device to perform operations including stopping supply of a DC voltage by an AC power supply unit after instructing an external power supply device to start supply of a DC voltage. The server device has the AC power supply unit configured to convert an AC voltage received from an AC power supply to a DC voltage and a DC power supply input part configured to receive supply of a DC voltage outputted by an AC power supply unit of the external power supply device. The server device runs at a DC voltage supplied by at least one of the AC power supply unit and the DC power supply input part.

Further, an external power supply device as one of the other aspects of the present invention is an external power supply device supplying a DC voltage to a DC power supply input part of a server device. The server device has an AC power supply unit and the DC power supply input part receiving supply of a DC voltage from outside.

The external power supply device has a plurality of AC power supply units each configured to convert an AC voltage received from an AC power supply to a DC voltage, and a plurality of connectors each configured to connect a wire.

The server device is connected to the connector.

The external power supply device has a connection changeover part configured to connect the AC power supply unit to the connector, and a control circuit configured to instruct the connection changeover part to connect the AC power supply unit to the connector in accordance with an instruction received from the server device.

Further, a server system as one of the other aspects of the present invention is a server system having at least one server device and an external power supply device connected to the server device.

The server device has an AC power supply unit configured to convert an AC voltage received from an AC power supply to a DC voltage, and a DC power supply input part configured to receive supply of a DC voltage outputted by an AC power supply unit of an external power supply device.

The server device runs at a DC voltage supplied by at least one of the AC power supply unit and the DC power supply input part.

The configurations of the present invention as described above makes it possible to provide a server device which solves a problem of difficulty to employ an appropriate redundant mechanism of a power supply.

BRIEF DESCRIPTION OF DRAWINGS

FIG. 1 is a diagram showing an example of the overall configuration of a server system according to a first exemplary embodiment of the present invention;

FIG. 2 is a block diagram showing an example of the configuration of a redundant power supply device shown in FIG. 1;

FIG. 3 is a block diagram showing an example of the configuration of a server device shown in FIG. 1;

FIG. 4 is a sequence diagram showing an example of the operation of the server system in the first exemplary embodiment;

FIG. 5 is a sequence diagram showing an example of the operation of the server system when a new power supply unit is inserted in the server system in the first exemplary embodiment;

FIG. 6 is a flowchart showing an example of the flow of a diagnosis made in the redundant power supply device in the first exemplary embodiment;

FIG. 7 is a block diagram showing an example of the configuration of a server device described in a second exemplary embodiment of the present invention;

FIG. 8 is a flowchart showing an example of the operation of the server device in the second exemplary embodiment;

FIG. 9 is a block diagram showing an example of the configuration of an external power supply device described in the second exemplary embodiment of the present invention; and FIG. 10 is a block diagram showing an example of the configuration of a server system described in the second exemplary embodiment of the present invention.

EXEMPLARY EMBODIMENT

[First Exemplary Embodiment]

FIG. 1 is a diagram showing an example of the overall configuration of a server system 1. FIG. 2 is a block diagram showing an example of the configuration of a redundant power supply device 2. FIG. 3 is a block diagram showing an example of the configuration of a server device 3. FIG. 4 is a sequence diagram showing an example of the operation of the server system 1. FIG. 5 is a sequence diagram showing an example of the operation of the server system 1 when a new power supply unit 31 is inserted in the server system 1. FIG. 6 is a flowchart showing an example of the flow of a diagnosis made in the redundant power supply device 2.

The first exemplary embodiment of the present invention describes the server system 1 in which the power supply of the server device 3 has redundancy. As described later, the server device 3 in this exemplary embodiment has a power supply unit 31 (an AC power supply unit) which converts an AC (alternating) voltage received from an AC power supply to a DC (direct) voltage, and a connector 32 (a DC power supply input part) which receives supply of a DC voltage from the redundant power supply device 2. By thus providing the server device 3 with one power supply unit 31 and one connector 32, it is possible to make the power supply have appropriate redundancy as described later.

Referring to FIG. 1, the server system in this exemplary embodiment has the redundant power supply device 2 (an external power supply device) and a plurality of server devices 3-1, 3-2, 3-3 . . . (written as the server device 3 when not particularly distinguished from each other hereinafter).

The redundant power supply device 2 has a plurality of power supply units 21-1, 21-2 . . . (written as the power supply unit 21 when not particularly distinguished from each other hereinafter) and a plurality of connectors 22-1, 22-2 . . . (written as the connector 22 when not particularly distinguished from each other hereinafter). The server device 3 has one power supply unit 31 and one connector 32. The redundant power supply device 2 and the server device 3 are connected so as to be able to flow an electric current and also transmit and receive management signals via a direct current power supply cable or a backplane (BP) connected to the connector 22 and the connector 32.

As an example of the configuration of the server system 1, FIG. 1 shows a case where the server system 1 has one redundant power supply device 2 and a plurality of server devices 3. However, the configuration of the server system 1 is not limited to the case shown in FIG. 1. For example, the server system 1 may have a plurality of redundant power supply devices 2. In addition, it is sufficient for the server system 1 to have at least one server device 3.

Further, in this exemplary embodiment, the redundant power supply device 2 has a plurality of power supply units 21. However, it is sufficient for the redundant power supply device 2 to have at least one power supply unit 21.

In response to a management signal (notification) from the server device 3 connected to the connector 22 of the redundant power supply device 2, the redundant power supply device 2 supplies a DC voltage to the server device 3 which is the transmission source of the management signal. Moreover, the redundant power supply device 2 diagnoses the status of its power supply unit 21 (whether the power supply unit 21 is likely to break, have a problem, and so on), for example, at predetermined intervals.

FIG. 2 shows an example of the configuration of the redundant power supply device 2. Referring to FIG. 2, the redundant power supply device 2 in this exemplary embodiment has, for example, a plurality of power supply units 21, a plurality of connectors 22, a control circuit 23, a changeover switch 24, and a diagnosis circuit 25.

Further, the redundant power supply device 2 in this exemplary embodiment has LEDs (light emitting diodes), which are not shown in the drawings, associated with the power supply units 21, respectively. As described later, for example, when a power supply unit 21-2 is in use (the power supply unit 21 and the server device 3 are connected), the redundant power supply device 2 turns on a green LED associated with the power supply unit 21-2. Moreover, for example, when it is diagnosed that a problem is likely to occur in a power supply unit 21-3, the redundant power supply device 2 turns on a red LED associated with the power supply unit 21-3. Thus, the redundant power supply device 2 is configured to be capable of distinguishing from outside the power supply unit 21 in use and the power supply unit 21 diagnosed as having a trouble. Besides, the redundant power supply device 2 has a notification unit (for example, an acoustic device for notification with an alarm or the like), which is not shown in the drawings, for notifying occurrence of a problem to the manager of the server system 1.

The power supply unit 21 (AC power supply unit) has a function as an AC/DC conversion unit, and converts an AC voltage received from an AC power supply (for example, an external power supply system) to a DC voltage. The power supply unit 21 outputs a plurality of DC voltages necessary for the servers, for example, 12 V, 5.5 V and 3.3 V.

Further, the power supply unit 21 is connected to the changeover switch 24 by a plurality of conductor lines so as to be able to flow electric currents at the respective voltages mentioned above. As described later, the power supply unit 21 and the connector 22 are connected by the changeover switch 24, whereby a DC voltage outputted by the power supply unit 21 is supplied to the server device 3 via the connector 22.

The connector 22 is connected to the server device 3 via a direct current power supply cable or a backplane. Moreover, the connector 22 is connected to the changeover switch 24 so as to be able to flow an electric current and is also connected to the control circuit 23 so as to be able to transmit and receive management signals. Thus, the connector 22 connects various wires.

As described above, the power supply unit 21 and the connector 22 are connected by the changeover switch 24, whereby a DC voltage outputted by the power supply unit 21 is supplied to the server device 3 via the connector 22. Moreover, a management signal transmitted from the server device 3 is transmitted to the control circuit 23 via the connector 22, and a management signal transmitted from the control circuit 23 is transmitted to the server device 3 via the connector 22.

The control circuit 23 controls connection changeover by the changeover switch 24, diagnosis of the power supply unit 21, turning on and off of an LED, notification to the manager, and so on.

The control circuit 23 is connected to the changeover switch 24 so as to be able to transmit and receive changeover control signals. The control circuit 23 notifies a changeover control signal to the changeover switch 24, thereby controlling connection changeover by the changeover switch 24. For example, when receiving a management signal from the server device 3 or in the case of diagnosing the status of the power supply unit 21, the control circuit 23 transmits a corresponding changeover control signal to the changeover switch 24. Moreover, the control circuit 23 receives from the changeover switch 24 a changeover control signal representing that connection has been switched on the basis of notification from the control circuit 23.

To be specific, for example, the control circuit 23 receives a management signal (notification) instructing to start supply of a DC voltage from the server device 3 via the connector 22. Then, the control circuit 23 transmits (notifies) to the changeover switch 24 a changeover control signal instructing to connect the power supply unit 21 to the connector 22 having mediated the management signal. After that, the control circuit 23 receives a changeover control signal representing completion of changeover from the changeover switch 24. Then, the control circuit 23 turns on a green LED associated with the connected power supply unit 21. Moreover, the control circuit 23 notifies a management signal representing that supply of a DC voltage has been started to the server device 3 which is the transmission source of the management signal instructing to start supply of a DC voltage.

The control circuit 23 notifies to the changeover switch 24, for example, any power supply unit 21 selected from among power supply units 21 which are not connected to the server device 3 and red LEDs associated with which are not turned on, as a power supply unit 21 to be connected to the connector 22.

Further, for example, the control circuit 23 receives a management signal (notification) instructing to stop supply of a DC voltage from the server device 3 via the connector 22. Then, the control circuit 23 transmits (notifies) to the changeover switch 24 a changeover control signal instructing to disconnect the power supply unit 21 from the connector 22 having mediated the management signal. After that, the control circuit 23 receives a changeover control signal representing completion of changeover from the changeover switch 24. The control circuit 23 then turns off a green LED associated with the disconnected power supply unit 21.

Further, the control circuit 23 is connected to the diagnosis circuit 25 so as to be able to transmit and receive diagnosis control signals. On the basis of a diagnosis control signal received from the diagnosis circuit 25, the control circuit 23 turns on an associated red LED or notifies to the manager.

For example, the control circuit 23 transmits (notifies) to the changeover switch 24 a changeover control signal instructing to connect the power supply unit 21 to the diagnosis circuit 25 at predetermined intervals (or on the basis of a manager's instruction). After that, the control circuit 23 receives a diagnosis control signal representing a diagnosis result from the diagnosis circuit 25. In a case where the diagnosis control signal represents that a problem is likely to occur in the power supply unit 21, the control circuit 23 turns on a red LED associated with the power supply unit 21 and also notifies to the manager. Moreover, the control circuit 23 transmits to the changeover switch 24 a changeover control signal instructing to disconnect the power supply unit 21 from the diagnosis circuit 25. On the other hand, in a case where the diagnosis control signal represents absence of a problem in the power supply unit 21, the control circuit 23 does not turn on the red LED and so on, and transmits to the changeover switch 24 a changeover control signal instructing to disconnect the power supply unit 21 from the diagnosis circuit 25.

Thus, the control circuit 23 connects the power supply unit 21 to the diagnosis circuit 25 and diagnoses the status of the power supply unit 21, for example, at predetermined intervals. For example, by repeating the abovementioned process, the control circuit 23 can make a diagnosis of the status of the power supply unit 21 with respect to a plurality of power supply units. Moreover, the control circuit 23 can be configured to, in a case where any power supply unit 21 is connected to the server device 3, not transmit to the changeover switch 24 a connection changeover signal instructing to connect the power supply unit 21 connected to the server device 3 to the diagnosis circuit 25. In other words, the control circuit 23 can be configured to diagnose the status of a power supply unit 21 which is not connected to the server device 3 (that is, not connected to the connector 22) at predetermined intervals.

The changeover switch 24 (a connection changeover part) switches connection and disconnection of the power supply unit 21 to and from the connector 22 and connection and disconnection of the power supply unit 21 to and from the diagnosis circuit 25 in response to a changeover control signal (notification) from the control circuit 23. The changeover switch 24 is capable of connecting any power supply unit 21 to any connector 22, for example, connecting a power supply unit 21-1 to a connector 22-1 and connecting the power supply unit 21-1 to a connector 22-3. The changeover switch 24 is configured to not connect the power supply unit 21 to the connector 22 in the case of not receiving a changeover control signal instructing to connect the power supply unit 21 to the connector 22. In other words, until receiving a changeover control signal instructing to connect the power supply unit 21 to the connector 22, the power supply unit 21 is not connected to the connector 22 (the server device 3).

For example, the changeover switch 24 receives from the control circuit 23 a changeover control signal instructing to connect the power supply unit 21 to the connector 22. Then, on the basis of the received changeover control signal, the changeover switch 24 connects the power supply unit 21 and the connector 22 represented by the changeover control signal. The changeover switch 24 then transmits a changeover control signal representing completion of changeover to the control circuit 23.

Further, for example, the changeover switch 24 receives from the control circuit 23 a changeover control signal instructing to disconnect the power supply unit 21 from the connector 22. Then, on the basis of the received changeover control signal, the changeover switch 24 terminates connection between the power supply unit 21 and the connector 22 represented by the changeover control signal. The changeover switch 24 then transmits a changeover control signal representing completion of changeover to the control circuit 23.

Further, for example, the changeover switch 24 receives from the control circuit 23 a changeover control signal instructing to connect the power supply unit 21 to the diagnosis circuit 25. Then, on the basis of the received changeover control signal, the changeover switch 24 connects the power supply unit 21 and the diagnosis circuit 25 represented by the changeover control signal. The changeover switch 24 then transmits a changeover control signal representing completion of changeover to the control circuit 23. Moreover, upon receiving a changeover control signal instructing to disconnect the power supply unit 21 from the diagnosis circuit 25, the changeover switch 24 disconnects the power supply unit 21 from the diagnosis circuit 25 on the basis of the changeover control signal. The changeover switch 24 then transmits to the control circuit 23 a changeover control signal representing completion of changeover.

The diagnosis circuit 25 diagnoses the status of the power supply unit 21 of the redundant power supply device 2.

The diagnosis circuit 25 has a storage device, which is not shown in the drawings, and holds threshold information of power supply characteristics (for example, a rise time threshold, a fall time threshold, an electric current threshold, and so on) in the storage device. Moreover, when supplied with a DC voltage from the power supply unit 21, the diagnosis circuit 25 measures a rise time, a fall time, the amount of flowing electric current and so on while changing load, for example. The diagnosis circuit 25 then compares the measurement result with the threshold information. The diagnosis circuit 25 thus diagnoses an indication of a failure of the power supply unit 21 connected thereto.

For example, the diagnosis circuit 25 determines there is an indication of a failure of the power supply unit 21 in a case where the rise time exceeds the rise time threshold or in a case where the fall time exceeds the fall time threshold. Then, the diagnosis circuit 25 transmits a diagnosis control signal representing a problem is likely to occur to the control circuit 23. On the other hand, in a case where the rise time is not more than the rise time threshold and the fall time is not more than the fall time threshold, the diagnosis circuit 25 transmits a diagnosis control circuit representing absence of a problem to the control circuit 23.

Thus, the diagnosis circuit 25 receives supply of a DC voltage from the power supply unit 21 connected to the diagnosis circuit 25 and thereby diagnoses the status of the connected power supply unit 21. The details of a diagnosis made by the diagnosis circuit 25 is not limited to the cases described above. For example, the diagnosis circuit 25 may be configured to transmit a diagnosis control signal representing a problem is likely to occur in a case where the rise time is more than the rise time threshold and the fall time is more than the fall time threshold. Moreover, the diagnosis circuit 25 may be configured to make a diagnosis by using either the rise time or the fall time, or may be configured to make a diagnosis in consideration of other information such as a measured electric current value. Moreover, the diagnosis circuit 25 may be configured to, for example, previously hold a plurality of rise time thresholds and diagnose the status of the power supply unit 21 step by step.

The server device 3 has a power supply unit 31 which converts an AC voltage received from an AC power supply to a DC voltage, and a connector 32 which receives supply of a DC voltage from the redundant power supply device 2. The server device 3 runs at a DC voltage supplied by at least one of the power supply unit 31 and the connector 32. Moreover, the server device 3 diagnoses the status of its power supply unit 31, for example, at predetermined intervals.

FIG. 3 shows an example of the configuration of the server device 3. Referring to FIG. 3, the server device 3 in this exemplary embodiment has, for example, the power supply unit 31, the connector 32, a control circuit 33, a changeover switch 34, a diagnosis circuit 35, a backflow prevention diode 36, and a motherboard 37.

Further, the server device 3 in this exemplary embodiment has an LED (light emitting diode), which is not shown in the drawings, associated with the power supply unit 31. As described later, the server device 3 turns on a green LED, for example, in a case where the power supply unit 31 is in use (a DC voltage is supplied from the power supply unit 31 to the motherboard). On the other hand, the server device 3 turns on a red LED, for example, in a case where it is diagnoses that a problem is likely to occur as a result of the diagnosis of the power supply unit 31. Thus, the server device 3 is configured so that the status of the power supply unit 31 can be determined from outside. Moreover, the server device 3 in this exemplary embodiment has a notification unit (for example, an acoustic device for notifying by an alarm or the like), which is not shown in the drawings, for notifying occurrence of a problem to the manager of the server system 1.

The power supply unit 31 (AC power supply unit) has a function as an AC/DC conversion unit, and converts an AC voltage received from an AC power supply (for example, an external power supply system) to a DC voltage. The power supply unit 31 outputs a plurality of DC voltages necessary for a server, such as 12 V, 5.5 V and 3.3 V.

Further, the power supply unit 31 is connected to the changeover switch 34 by a plurality of conductive lines so as to be able to flow electric current at the respective voltages mentioned above. As described later, in an ordinary state, the power supply unit 31 is connected to the motherboard 37 via the changeover switch 34. In other words, in the ordinary state, a DC voltage outputted by the power supply unit 31 is supplied to the motherboard 37 via the changeover switch 34. The ordinary state herein is a state where the diagnosis circuit 35 does not diagnose that a problem is likely to occur in the power supply unit 31 (a red LED is not turned on) or a state where a diagnosis by the diagnosis circuit 35 is not made. In other words, the ordinary state is a state where the power supply unit 31 is usable.

The connector 32 is connected to the redundant power supply device 2 via a direct current power supply cable or a backplane. Moreover, the connector 32 is connected to the motherboard 37 so as to be able to flow an electric current and is also connected to the control circuit 33 so as to be able to transmit and receive management signals. Thus, the connector 32 connects various wires. As shown in FIG. 3, a connector-side conductive line extending from the connector 32 joins together with a conductive line extending from the changeover switch 34 to the motherboard 37 in the middle of the conductive line. Moreover, as described later, the backflow prevention diode 36 is provided on each conductive line.

With such a configuration, a DC voltage supplied by the redundant power supply device 2 is supplied to the motherboard 37 via the connector 32. Moreover, a management signal transmitted by the control circuit 33 is transmitted to the redundant power supply device 2 via the connector 32, and a management signal transmitted by the redundant power supply device 2 is transmitted to the control circuit 33 via the connector 32.

The control circuit 33 controls connection changeover by the changeover switch 34, diagnosis of the power supply unit 31, instruction to start or stop supply of a DC voltage to the redundant power supply device 2, turning on or off the LED, notification to the manager, and so on.

The control circuit 33 is connected to the changeover switch 34 so as to be able to transmit and receive changeover control signals. The control circuit 33 notifies a changeover control signal to the changeover switch 34 and thereby controls connection changeover by the changeover switch 24. For example, the control circuit 33 transmits a changeover control signal associated with the changeover switch 34 at the time of diagnosis of the status of the power supply unit 31. Moreover, the control circuit 33 receives from the changeover switch 34 a changeover control signal representing that connection has been switched on the basis of notification by the control circuit 33.

Further, the control circuit 33 is connected to the diagnosis circuit 35 so as to be able to transmit and receive diagnosis control signals. The control circuit 33 turns on the red LED and sends notification to the manager on the basis of a diagnosis control signal received from the diagnosis circuit 35.

To be specific, for example, the control circuit 33 transmits (notifies) a management signal instructing to start supply of a DC voltage to the redundant power supply device 2 at predetermined intervals (or, for example, on the basis of a manager's instruction). In other words, the control circuit 33 controls to switch to supply of a DC voltage by the redundant power supply device 2. Consequently, supply of a DC voltage from the redundant power supply device 2 to the motherboard 37 via the connector 32 is started. Moreover, the control circuit 33 receives a management signal representing supply of a DC voltage has been started from the redundant power supply device 2. The control circuit 33 then transmits (notifies) to the changeover switch 34 a changeover control signal instructing to connect the power supply unit 31 to the diagnosis circuit 35. Consequently, supply of a DC voltage from the power supply unit 31 to the motherboard 37 stops, and the destination of supply of the DC voltage outputted by the power supply unit 31 switches to the diagnosis circuit 35. After that, the control circuit 33 receives a diagnosis control signal representing the diagnosis result from the diagnosis circuit 35. In a case where the diagnosis control signal represents a problem is likely to occur in the power supply unit 31, the control circuit 33 turns on the red LED and also notifies to the manager. On the other hand, in a case where the diagnosis control signal represents absence of a problem in the power supply unit 31, the control circuit 33 does not turn on the red LED. The control circuit 33 disconnects the power supply unit 31 from the diagnosis circuit 35, and transmits to the changeover switch 34 a changeover control signal instructing to connect the power supply unit 31 to the motherboard 37. The control circuit 33 then transmits (notifies) a management signal representing stoppage of supply of a DC voltage to the redundant power supply device 2.

Further, assuming the control circuit 33 turns on the red LED and notifies to the manager and consequently the power supply unit 31 is replaced, a DC voltage is supplied from the power supply unit 31 to the diagnosis circuit 35, and the control circuit 33 receives a diagnosis control signal representing the diagnosis result from the diagnosis circuit 35. In a case where the diagnosis control signal represents the replaced power supply unit 31 is also likely to cause a problem, the control circuit 33 keeps the red LED turned on (or blinking, for example), and also notifies to the manager. On the other hand, in a case where the diagnosis control signal represents absence of a problem in the power supply unit 31, the control circuit 33 disconnects the power supply unit 31 from the diagnosis circuit 35, and transmits a changeover control signal instructing to connect the power supply unit 31 to the motherboard 37 to the changeover switch 34. Moreover, the control circuit 33 turns off the red LED. Moreover, the control circuit 33 transmits a management signal instructing to stop supply of a DC voltage to the redundant power supply device 2.

Meanwhile, the control circuit 33 may be configured to be able to detect replacement of the power supply unit 31. Moreover, in a case where the control circuit 33 detects the power supply unit 31 has been replaced and the power supply unit 31 has not been connected to the diagnosis circuit 35, the control circuit 33 can transmit a changeover control signal instructing to connect the power supply unit 31 to the diagnosis circuit 35 to the changeover switch 34. Thus, the control circuit 33 connects the power supply unit 31 to the diagnosis circuit 35 and diagnoses the status of the power supply unit 31, for example, at predetermined intervals. Consequently, in a case where a problem is likely to occur in the status of the power supply unit 31, the control circuit 33 can detect the problem.

The changeover switch 34 (a connection changeover part) switches connection of the power supply unit 31 to the motherboard 37 to connection of the power supply unit 31 to the diagnosis circuit 35 in response to a changeover control signal (notification) from the control circuit 33. In other words, the changeover switch 34 connects the power supply unit 31 to the motherboard 37 in the ordinary state. The changeover switch 34 then switches connection of the power supply unit 31 to the motherboard 37 to connection of the power supply unit 31 to the diagnosis circuit 35 in response to the changeover control signal. Thus, the changeover switch 34 switches the destination of supply of a DC voltage outputted by the power supply unit 31 from the motherboard 37 to the diagnosis circuit 35 in response to the changeover control signal. Moreover, the changeover switch 34 switches the destination of supply of a DC voltage outputted by the power supply unit 31 from the diagnosis circuit 35 to the motherboard 37 in response to the changeover control signal.

For example, the changeover switch 34 receives a changeover control signal instructing to connect the power supply unit 31 to the diagnosis circuit 35, from the control circuit 33. Then, the changeover switch 34 connects the power supply unit 31 to the diagnosis circuit 35 on the basis of the received changeover control signal. The changeover switch 34 then transmits a changeover control signal representing completion of changeover to the control circuit 33.

Further, for example, the changeover switch 34 receives from the control circuit 33 a changeover control signal instructing to connect the power supply unit 31 to the motherboard 37. Then, the changeover switch 34 connects the power supply unit 31 to the motherboard 37 on the basis of the received changeover control signal. The changeover switch 34 then transmits a changeover control signal representing completion of changeover to the control circuit 33.

The diagnosis circuit 35 diagnoses the status of the power supply unit 31 of the server device 3. The configuration of the diagnosis circuit 35 is the same as the diagnosis circuit 25 of the redundant power supply device 2. Therefore, a detailed description thereof will be omitted.

The backflow prevention diode 36 prevents an electric current from flowing back from the motherboard 37 toward the power supply unit 31 and the connection 32. The backflow prevention diodes 36 are provided on conductive lines (connection paths) between the power supply unit 31 and the motherboard 37 and on conductive lines (on connection paths) between the connector 32 and the motherboard 37. To be specific, the backflow prevention diodes 36 are provided on conductive lines connecting the changeover switch 34 to the motherboard 37 and conductive lines extending from the connector at positions closer to the changeover switch 34 and the connector 32 from the junctions of the changeover-switch-side conductive lines and the connector-side conductive lines.

The motherboard 37 (an operation part) supplied with a DC voltage and operates. The motherboard 37 operates at a DC voltage supplied from at least one of the power supply unit 31 and the connector 32.

An example of the configuration of the server system 1 has been described above. Next, with reference to FIGS. 4 to 6, an example of the operation of the server system 1 will be described. First, with reference to FIG. 4, an example of the operation when the server device 3 makes a diagnosis of the power supply unit 31 will be described.

With reference to FIG. 4, the control circuit 33 of the server device 3 transmits (notifies) to the redundant power supply device 2 a management signal instructing to start supply of a DC voltage, for example, at predetermined intervals (step S101).

The control circuit 23 receives the management signal via the connector 22. Then, the control circuit 23 transmits to the changeover switch 24 a changeover control signal instructing to connect the power supply unit 21 to the connector 22 having mediated the management signal (step S201).

The changeover switch 24 receives the changeover control signal instructing to connect the power supply unit 21 to the connector 22 from the control circuit 23. Then, the changeover switch 24 connects the power supply unit 21 and the connector 22 represented by the received changeover control signal on the basis of the changeover control signal (step S202).

The control circuit 23 receives a changeover control signal representing completion of changeover from the changeover switch 24. Then, the control circuit 23 turns on a green LED associated with the connected power supply unit 21. Moreover, the control circuit 23 notifies a management signal representing supply of a DC voltage has been started, to the server device 3 having transmitted the management signal instructing to start supply of a DC voltage (step S203).

The control circuit 33 of the server device 3 receives the management signal. Then, the control circuit 33 transmits to the changeover switch 34 a changeover control signal instructing to connect the power supply unit 31 to the diagnosis circuit 35 (step S102).

The changeover switch 34 receives the changeover control signal instructing to connect the power supply unit 31 to the diagnosis circuit 35 from the control circuit 33. Then, the changeover switch 34 connects the power supply unit 31 to the diagnosis circuit 35 on the basis of the received changeover control signal (step S103).

The diagnosis circuit 35 performs measurement of a rise time, a fall time, the amount of a flowing electric current, and so on, while changing load. The diagnosis circuit 35 then compares the result of the measurement with threshold information. Thus, the diagnosis circuit 35 makes a diagnosis of an indication of a failure of the connected power supply unit 31 (step S104).

In a case where it is determined that a problem is likely to occur in the power supply unit 31 as a result of the diagnosis, the diagnosis circuit 35 transmits to the control circuit 33 a diagnosis control signal representing a problem is likely to occur (step S105).

The control circuit 33 receives the diagnosis control signal representing a problem is likely to occur from the diagnosis circuit 35. On the basis of the diagnosis control signal, the control circuit 33 turns on the red LED and also notifies to the manager (step S106).

On the other hand, in the case of determining there is no problem in the power supply unit 31, the diagnosis circuit 35 transmits a diagnosis control signal representing absence of a problem to the control circuit 33 (step S107).

The control circuit 33 receives the diagnosis control signal representing absence of a problem from the diagnosis circuit 35. Then, the control circuit 33 disconnects the power supply unit 31 from the diagnosis circuit 35, and transmits to the changeover switch 34 a changeover control signal instructing to connect the power supply unit 31 to the motherboard 37 (step S108).

The changeover switch 34 receives the changeover control signal from the control circuit 33. Then, the changeover switch 34 connects the power supply unit 31 to the motherboard 37 on the basis of the received changeover control signal (step S109). Then, the changeover switch 34 transmits a changeover control signal representing completion of changeover to the control circuit 33.

The control circuit 33 receives the changeover control signal. The control circuit 33 then transmits a management signal instructing to stop supply of a DC voltage, to the redundant power supply device 2 (step S110).

The control circuit 23 receives the management signal instructing to stop supply of a DC voltage via the connector 22. Then, the control circuit 23 transmits to the changeover switch 24 a changeover control signal instructing to disconnect the connector 22 having mediated the management signal from the power supply unit 21 (step S204).

The changeover switch 24 receives from the control circuit 23 the changeover control signal instructing to disconnect the connector 22 from the power supply unit 21. Then, on the basis of the received changeover control signal, the changeover switch 24 terminates connection between the connector 22 and the power supply unit 21 represented by the changeover control signal (step S205). The changeover switch 24 then transmits a changeover control signal representing completion of changeover to the control circuit 23.

After that, the control circuit 23 receives the changeover control signal representing completion of changeover from the changeover switch 24. The control circuit 23 then turns off the green LED associated with the disconnected power supply unit 21.

An example of the operation when the server device 3 makes a diagnosis of the power supply unit 31 has been described above. Next, with reference to FIG. 5, an example of the operation when the power supply unit 31 of the server device 3 is replaced will be described. As described above, when receiving a diagnosis control signal representing a problem is likely to occur from the diagnosis circuit, the control circuit 33 turns on the red LED and also notifies to the manager. Replacement of the power supply unit 31 is performed on the basis of turning on the red LED, notification, or the like.

When the power supply unit 31 is replaced, the control circuit 33 detects the power supply unit 31 has been replaced (step S301). Then, the control circuit 33 transmits to the changeover switch 34 a changeover control signal instructing to connect the power supply unit 31 to the diagnosis circuit 35 (step S302).

The changeover switch 34 receives from the control circuit 33 the changeover control signal instructing to connect the power supply unit 31 to the diagnosis circuit 35. Then, on the basis of the received changeover control signal, the changeover switch 34 connects the power supply unit 31 to the diagnosis circuit 35 (step S303).

In a case where the power supply unit 31 is replaced on the basis of turning on the red LED, notification or the like described with reference to FIG. 4, the power supply unit 31 and the diagnosis circuit 35 are connected when the power supply unit 31 is replaced. In this case, steps S301 to S303 may be omitted.

The diagnosis circuit 35 performs measurement of a rise time, a fall time, the amount of a flowing electric current, and so on, while changing load. The diagnosis circuit 35 then compares the result of the measurement with threshold information. Thus, the diagnosis circuit 35 makes a diagnosis of an indication of a failure of the connected power supply unit 31 (step S304).

In the case of determining a problem is likely to occur in the power supply unit 31 as a result of the diagnosis, the diagnosis circuit 35 transmits a diagnosis control signal representing a problem is likely to occur, to the control circuit 33 (step S305).

The control circuit 33 receives a diagnosis control signal representing a problem is likely to occur from the diagnosis circuit 35. On the basis of the diagnosis control signal, the control circuit 33 keeps the red LED turned on and also notifies to the manager (step S306).

On the other hand, in the case of determining there is no problem in the power supply unit 1 as a result of the diagnosis, the diagnosis circuit 35 transmits a diagnosis control circuit representing absence of a problem to the control circuit 33 (step S307).

When receiving the diagnosis control signal, the control circuit 33 disconnects the power supply units 31 from the diagnosis circuit 35, and transmits to the changeover switch 34 a changeover control signal instructing to connect the power supply unit 31 to the motherboard 37 (step S308). When receiving the changeover control signal from the control circuit 33, the changeover switch 34 connects the power supply unit 31 to the motherboard 37 on the basis of the received changeover control signal (step S309). The changeover switch 34 then transmits a changeover control signal representing completion of changeover to the control circuit 33.

Further, the control circuit 33 transmits a management signal instructing to stop supply of a DC voltage, to the redundancy power supply device 2 (step S310). The control circuit 23 receives the management signal instructing to stop supply of a DC voltage, via the connector 22. Then, the control circuit 23 transmits to the changeover switch 24 a changeover control signal instructing to disconnect the connector 22 having mediated the management signal from the power supply unit 21 (step S401). The changeover switch 24 receives the changeover control signal instructing to disconnect the connector 22 from the power supply unit 21, from the control circuit 23. Then, on the basis of the received changeover control signal, the changeover switch 24 terminates connection between the connector 22 and the power supply unit 21 represented by the changeover control signal (step S402). The changeover switch 24 then transmits a changeover control signal representing completion of changeover to the control circuit 23. After that, the control circuit 23 receives the changeover control signal representing completion of changeover from the changeover switch 24. The control circuit 23 then turns off the green LED associated with the disconnected power supply unit 21.

An example of the operation when the power supply unit 31 of the server device 3 is replaced has been described above. Next, with reference to FIG. 6, an example of the operation when the redundancy power supply device 2 makes a diagnosis of the status of the power supply unit 21.

With reference to FIG. 6, the control circuit 23 of the redundancy power supply device 2 transmits a changeover control signal instructing to connect the power supply unit 21 to the diagnosis circuit 25, to the changeover switch 24, for example, at predetermined intervals (step S501).

The changeover switch 24 receives from the control circuit 23 the changeover control signal instructing to connect the power supply unit 21 to the diagnosis circuit 25. Then, on the basis of the received changeover control signal, the changeover switch 24 connects the power supply unit 21 and the diagnosis circuit 25 represented by the changeover control signal (step S502).

The diagnosis circuit 25 performs measurement of a rise time, a fall time, the amount of a flowing electric current, and so on, while changing load. The diagnosis circuit 25 then compares the result of the measurement with threshold information. Thus, the diagnosis circuit 25 makes a diagnosis of an indication of a failure of the connected power supply unit 21 (step S503).

In the case of determining a problem is likely to occur in the power supply unit 21 as a result of the diagnosis (step S504, Yes), the diagnosis circuit 25 transmits a diagnosis control signal representing a problem is likely to occur to the control circuit 23 (step S507). When receiving the diagnosis control signal, the control circuit 23 turns on the red LED and also notifies to the manager on the basis of the diagnosis control signal (step S508). Further, the control circuit 23 transmits a changeover control signal instructing to disconnect the power supply unit 21 from the diagnosis circuit 25, to the changeover switch 24. Thus, the changeover switch 24 disconnects the power supply unit 21 from the diagnosis circuit 25 (step S509).

On the other hand, in the case of determining there is no problem in the power supply unit 21 as a result of the diagnosis (step S504, No), the diagnosis circuit 25 transmits a diagnosis control circuit representing absence of a problem to the control circuit 23 (step S505). When receiving the diagnosis control signal, the control circuit 23 transmits to the changeover switch 24 a changeover control signal instructing to disconnect the power supply unit 21 from the diagnosis circuit 25. Thus, the changeover switch 24 disconnects the power supply unit 21 from the diagnosis circuit 25 (step S506).

The redundancy power supply device 2 executes the process as described above on each power supply unit 21 of the redundancy power supply device 2, for example. Meanwhile, the redundancy power supply device 2 may be configured to diagnose the status of the power supply unit 21 which is not connected to the server device 3, for example, at predetermined intervals.

Thus, the server device 3 in this exemplary embodiment has the power supply unit 31 and the connector 32. Such a configuration allows the server device 3, for example, to be supplied with a DC voltage by the power supply unit 31, for example, in the ordinary state and to be supplied with a DC voltage by the connector 32, for example, in a case where a problem is likely to occur in the power supply unit 31. Consequently, it is possible to secure redundancy of the power supply while securing versatility.

Further, the number of power supply units can be less compared with a case where each server device 3 is equipped with two power supply units. Consequently, a power supply space in the whole system can be smaller. As a result, a space in the server gets broader and scalability can increase. Moreover, the total number of power supplies can be less, so that it is possible to decrease the price of the system and decrease a heat source, and it is possible to more easily realize a cooling design.

In this exemplary embodiment, it is possible to distinguish the power supply unit 21 in use from outside among the power supply units of the redundancy power supply device 2. Therefore, in a case where a problem occurs in the power supply unit 31 of the server device 3, the power supply unit 21 which is not in use among the power supply units of the redundancy power supply device 2 is demounted and inserted into the power supply unit 31, for example. Thus, according to the present invention, the redundancy power supply device 2 can serve as a stock of power supply unit 31.

Further, the number of the power supply units 21 of the redundancy power supply device 2 can be freely changed in accordance with toughness of the server system 1, or the like. For example, in the case of the server system 1 having N pieces of server devices 3, it can be considered that the redundancy power supply device 2 has 1 to N pieces of power supply units 2 (can be changed in accordance with the toughness of the system).

Further, in this exemplary embodiment, the redundancy power supply device 2 and the server device 3 have notification units. However, one notification unit may be shared in the whole server system 1.

[Second Exemplary Embodiment]

Next, referring to FIGS. 7 to 10, a server device 4 in which a power supply has redundancy, an external power supply device 5 supplying a DC voltage to the server device 4, and a server system 6 including the server device 4 in which a power supply has redundancy and an external power supply device 7 will be described. In this exemplary embodiment, the outline of each configuration will be described.

First, with reference to FIGS. 7 and 8, the server device 4 in this exemplary embodiment will be described.

Referring to FIG. 7, the server device 4 has an AC power supply unit 41 and a DC power supply input part 42.

The AC power supply unit 41 converts an AC voltage received from an AC power supply to a DC voltage. The DC power supply input part 42 is supplied with a DC voltage outputted from the AC power supply unit of the external power supply device. The server device 4 then runs at DC voltages supplied by at least one of the AC power source unit 41 and the DC power supply input part 42.

Thus, the server device 4 in this exemplary embodiment has the AC power supply unit 41 and the DC power supply input part 42. Such a configuration enables the server device 4 in this exemplary embodiment to be supplied with a DC voltage by the AC power supply unit 41, for example, in the ordinary state and supplied with a DC voltage by the DC power supply input part 42, for example, in a case where the a problem is likely to occur in the AC power supply unit 41. Consequently, it is possible to secure redundancy of power supply while ensuring versatility. Moreover, it is possible to eliminate waste as compared with a case where the server device 4 is equipped with a plurality of AC power supply units 41. In other words, the server device can have an appropriate redundant configuration of power supply, eliminating waste and having versatility.

With the configuration as described above, the server device 4 runs as shown in FIG. 8. Referring to FIG. 8, the server device 4 is supplied with a DC voltage by at least one of the AC power supply unit 41 and the DC power supply input part 42 (step S601). The server device 4 then runs at the supplied DC voltage (step S602). By running in such an operation, the server device 4 can run while having an appropriate redundant configuration of power supply as described above.

Further, a power supply control method executed by the server device 4 is a power supply control method executed by a server device which has an AC power supply unit and a DC power supply input part. The AC power supply unit converts an AC voltage received from an AC power supply to a DC voltage. The DC power supply input part is supplied with a DC voltage outputted from the AC power supply unit of an external power supply device. The server device runs at a DC voltage supplied by at least one of the AC power supply unit and the DC power supply input part. The power supply control method includes stopping supply of a DC voltage from the AC power unit after instructing the external power supply device to start supply of a DC voltage.

Further, a given program can be installed into the server device 4. To be specific, a program as another aspect of the present invention is a program including instructions for causing a server device to realize a process. The server device has: an AC power supply unit which converts an AC voltage received from an AC power supply to a DC voltage; and a DC power supply input part which receives supply of a DC voltage outputted from an AC power supply unit of an external power supply device. The server device runs at the DC voltage supplied by at least one of the AC power supply unit and the DC power supply input part. The process is instructing the external power supply device to start supply of a DC voltage and thereafter stopping supply of a DC voltage from the AC power supply unit.

Next, with reference to FIG. 9, the external power supply device 5 in this exemplary embodiment will be described. The external power supply device 5 in this exemplary embodiment supplies a DC voltage to a DC power supply input part of a server device which has an AC power supply unit and a DC power supply input part receiving supply of a DC voltage from outside.

Referring to FIG. 9, the external power supply device 5 in this exemplary embodiment has a plurality of AC power supply units 51, a plurality of connectors 52, a connection changeover part 53, and a control circuit 54.

The AC power supply unit 51 converts an AC voltage received from an AC power supply to a DC voltage. The connector 52 connects wires. The server device is connected to the connector. The connection changeover part 53 connects the AC power supply unit 51 and the connector 52. The control circuit 54 instructs the connection control part 53 to connect the AC power supply unit 51 and the connector 52 in accordance with an instruction received from the server device.

Thus, the external power supply device 5 in this exemplary embodiment has the plurality of AC power supply units 51, the plurality of connectors 52, the connection changeover part 53, and the control circuit 54. Such a configuration enables the external power supply device 5 to supply a DC voltage to a server device in accordance with an instruction from the server device.

Next, with reference to FIG. 10, the server system 6 in this exemplary embodiment will be described. The server system 6 in this exemplary embodiment has the server device 4 and the external power supply device 7. As shown in FIG. 10, the server device 4 and the external power supply device 7 are connected. The external power supply device 7 has an AC power supply unit and is capable of supplying a DC voltage outputted by the AC power supply unit to the server device 4. Because the configuration of the server device 4 is the same as described before, a description thereof will be omitted. Such a configuration can also bring the same effect.

<Supplementary Notes>

The whole or part of the exemplary embodiments disclosed above can be described as in the following supplementary notes. Below, the overview of a server device and so on according to the present invention will be described. However, the present invention is not limited to the following configurations.

(Supplementary Note 1)

A server device comprising:

an AC power supply unit configured to convert an AC voltage received from an AC power supply to a DC voltage; and a DC power supply input part configured to receive supply of a DC voltage outputted by an AC power supply unit of an external power supply device, the server device running at a DC voltage supplied by at least one of the AC power supply unit and the DC power supply input part.

(Supplementary Note 2)

The server device according to Supplementary Note 1, the server device comprising a control circuit configured to execute control on the external power supply device so as to supply a DC voltage.

(Supplementary Note 3)

The server device according to Supplementary Note 2, wherein the control circuit is configured to stop supply of a DC voltage by the AC power supply unit after instructing the external power supply device to start supply of a DC voltage.

(Supplementary Note 4)

The server device according to Supplementary Note 2 or 3, the server device comprising:

a diagnosis circuit configured to diagnose a status of the AC power supply unit of the server device; and a connection changeover part configured to change a destination of supply of a DC voltage outputted by the AC power supply unit to the diagnosis circuit.

(Supplementary Note 5)

The server device according to Supplementary Note 4, wherein:

the control circuit is configured to issue to the connection changeover part an instruction to connect the AC power supply unit and the diagnosis circuit, after instructing the external power supply device to start supply of a DC voltage;

the connection changeover part is configured to connect the AC power supply unit and the diagnosis circuit in accordance with the instruction by the control circuit; and the diagnosis circuit is configured to be supplied with a DC voltage by the connected AC power supply unit, make a diagnosis of a status of the AC power supply unit, and give a notification of a result of the diagnosis to the control circuit.

(Supplementary Note 6)

The server device according to Supplementary Note 5, wherein the control circuit is configured to, in a case where it is determined there is no problem in a status of the AC power supply unit from the notification by the diagnosis circuit, instruct the connection changeover part to start supply of a DC voltage by the AC power supply unit and thereafter instruct the external power supply device to stop supply of a DC voltage.

(Supplementary Note 7)

The server device according to any of Supplementary Notes 4 to 6, wherein the diagnosis circuit is configured to diagnose a status of the AC power supply unit by making at least one of comparison of a rise time with a previously stored rise time threshold and comparison of a fall time with a fall time threshold, while changing load.

(Supplementary Note 8)

The server device according to any of Supplementary Notes 1 to 7, wherein backflow prevention diodes are mounted on a connection path between the AC power supply unit and an operation part configured to be supplied with a DC voltage and operate, and on a connection path between the DC power supply input part and the operation part, the backflow prevention diodes being configured to prevent electric current from flowing back from the operating part toward an AC/DC converter and the DC power supply input part.

(Supplementary Note 9)

A power supply control method executed by a server device having an AC power supply unit configured to convert an AC voltage received from an AC power supply to a DC voltage and a DC power supply input part configured to receive supply of a DC voltage outputted by an AC power supply unit of an external power supply device, the server device running at a DC voltage supplied by at least one of the AC power supply unit and the DC power supply input part, the power supply control method comprising stopping supply of a DC voltage by the AC power supply unit after instructing the external power supply device to start supply of a DC voltage.

(Supplementary Note 10)

The power supply control method according to Supplementary Note 9, comprising diagnosing a status of the AC power supply unit after instructing the external power supply device to start supply of a DC voltage.

(Supplementary Note 10-1)

The power supply control method according to Supplementary Note 10, comprising diagnosing a status of the AC power supply unit by making at least one of comparison of a rise time with a previously stored rise time threshold and comparison of a fall time with a fall time threshold, while changing load.

(Supplementary Note 11)

A program comprising instructions for causing a server device to perform operations including stopping supply of a DC voltage by an AC power supply unit after instructing an external power supply device to start supply of a DC voltage, the server device having the AC power supply unit configured to convert an AC voltage received from an AC power supply to a DC voltage and a DC power supply input part configured to receive supply of a DC voltage outputted by an AC power supply unit of the external power supply device, the server device running at a DC voltage supplied by at least one of the AC power supply unit and the DC power supply input part.

(Supplementary Note 11-1)

A program comprising instructions for causing a server device to perform operations including diagnosing a status of an AC power supply unit by making at least one of comparison of a rise time with a previously stored rise time threshold and comparison of a fall time with a fall time threshold, while changing load, the server device having the AC power supply unit configured to convert an AC voltage received from an AC power supply to a DC voltage and a DC power supply input part configured to receive supply of a DC voltage outputted by an AC power supply unit of an external power supply device, the server device running at a DC voltage supplied by at least one of the AC power supply unit and the DC power supply input part.

(Supplementary Note 12)

An external power supply device supplying a DC voltage to a DC power supply input part of a server device, the server device having an AC power supply unit and the DC power supply input part receiving supply of a DC voltage from outside, the external power supply device comprising a plurality of AC power supply units each configured to convert an AC voltage received from an AC power supply to a DC voltage, and a plurality of connectors each configured to connect a wire, the server device being connected to the connector, the external power supply device comprising a connection changeover part configured to connect the AC power supply unit to the connector, and a control circuit configured to instruct the connection changeover part to connect the AC power supply unit to the connector in accordance with an instruction received from the server device.

(Supplementary Note 13)

The external power supply device according to Supplementary Note 12, wherein the control circuit is configured to, when receiving an instruction to start supply of a DC power from the server device via the connector, instruct the connection changeover part to connect the connector having mediated the instruction to start supply to the AC power supply unit.

(Supplementary Note 14)

The external power supply device according to Supplementary Note 12 or 13, comprising a diagnosis circuit configured to diagnose a status of the AC power supply unit of the external power supply device.

(Supplementary Note 15)

The external power supply device according to Supplementary Note 14, wherein the control circuit is configured to instruct the connection changeover part to connect any of the AC power supply units not connected to the connectors to the diagnosis circuit.

(Supplementary Note 16)

A server system comprising at least one server device and an external power supply device connected to the server device, wherein:

the server device has an AC power supply unit configured to convert an AC voltage received from an AC power supply to a DC voltage, and a DC power supply input part configured to receive supply of a DC voltage outputted by an AC power supply unit of an external power supply device; and the server device runs at a DC voltage supplied by at least one of the AC power supply unit and the DC power supply input part.

(Supplementary Note 16-1)

The server system according to Supplementary Note 16, wherein the server device has a control circuit configured to execute control on the external power supply device so as to supply a DC voltage.

(Supplementary Note 16-2)

The server device according to Supplementary Note 16-1, wherein the control circuit is configured to stop supply of a DC voltage by the AC power supply unit after instructing the external power supply device to start supply of a DC voltage.

The program described in the exemplary embodiments and supplementary notes is stored in a storage device or recorded on a computer-readable recording medium. For example, the recording medium is a portable medium such as a flexible disk, an optical disk, a magneto-optical disk and a semiconductor memory.

Although the present invention has been described above with reference to the exemplary embodiments, the present invention is not limited to the exemplary embodiments. The configurations and details of the present invention can be changed in various manners that can be understood by one skilled in the art within the scope of the present invention.

1 server system
2 redundant power supply device
21 power supply unit
22 connector
23 control circuit
24 changeover switch
25 diagnosis circuit
3 server device
31 power supply unit
32 connector 33 control circuit
34 changeover switch
35 diagnosis circuit
36 backflow prevention diode
37 motherboard
4 server device
41 AC power supply unit
42 DC power input part
5 external power supply device
51 AC power supply unit
52 connector
53 connection changeover part
54 control circuit
6 server system
7 external power supply device

The invention claimed is:

1. A server device comprising:
an AC power supply unit having a function as an AC/DC conversion unit, the AC power supply unit being configured to convert an AC voltage received from an outside power supply to a DC voltage and output the DC voltage; and
a connector connected with an external redundant power supply device and configured to receive supply of a DC voltage outputted from the redundant power supply device, the redundant power supply device including a plurality of power supply units each having a function as an AC/DC conversion unit and converting an AC voltage received from the outside power supply to a DC voltage and outputting the DC voltage,
the server device running at a DC voltage supplied by at least one of the AC power supply unit and the redundant power supply device connected via the connector,
the server device comprising:
a control circuit configured to execute control on the external redundant power supply device so as to supply a DC voltage;
a diagnosis circuit configured to diagnose a status of the AC power supply unit; and
a connection changeover part configured to change a destination of supply of a DC voltage outputted by the AC power supply unit to the diagnosis circuit, wherein:
the control circuit is configured to issue to the connection changeover part an instruction to connect the AC power supply unit and the diagnosis circuit, after instructing the external redundant power supply device to start supply of a DC voltage;
the connection changeover part is configured to connect the AC power supply unit and the diagnosis circuit in accordance with the instruction by the control circuit; and
the diagnosis circuit is configured to be supplied with a DC voltage by the connected AC power supply unit, make a diagnosis of a status of the AC power supply unit, and give a notification of a result of the diagnosis to the control circuit.

2. The server device according to claim 1, wherein the control circuit is configured to stop supply of a DC voltage by the AC power supply unit after instructing the external redundant power supply device to start supply of a DC voltage.

3. The server device according to claim 1, wherein the control circuit is configured to, in a case where it is determined there is no problem in a status of the AC power supply unit from the notification by the diagnosis circuit, instruct the connection changeover part to start supply of a DC voltage by the AC power supply unit and thereafter instruct the external redundant power supply device to stop supply of a DC voltage.

4. The server device according to claim 1, wherein the diagnosis circuit is configured to diagnose a status of the AC power supply unit by making at least one of comparison of a rise time with a previously stored rise time threshold and comparison of a fall time with a fall time threshold, while changing load.

5. The server device according to claim 1, wherein backflow prevention diodes are mounted on a connection path between the AC power supply unit and an operation part configured to be supplied with a DC voltage and operate, and on a connection path between the connector and the operation part, the backflow prevention diodes being configured to prevent electric current from flowing back from the operation part toward an AC/DC converter and the connector.

6. A power supply control method executed by a server device having an AC power supply unit having a function as an AC/DC conversion unit, the AC power supply unit being configured to convert an AC voltage received from an outside power supply to a DC voltage and output the DC voltage and connector connected with an external redundant power supply device and configured to receive supply of a DC voltage outputted from the redundant power supply device, the redundant power supply device including a plurality of power supply units each having a function as an AC/DC conversion unit and converting an AC voltage received from the outside power supply to a DC voltage and outputting the DC voltage, the server device running at a DC voltage supplied by at least one of the AC power supply unit and the redundant power supply device connected via the connector,
the server device comprising:
a control circuit configured to execute control on the external redundant power supply device so as to supply a DC voltage;
a diagnosis circuit configured to diagnose a status of the AC power supply unit; and
a connection changeover part configured to change a destination of supply of a DC voltage outputted by the AC power supply unit to the diagnosis circuit, wherein:
the control circuit is configured to issue to the connection changeover part an instruction to connect the AC power supply unit and the diagnosis circuit, after instructing the external redundant power supply device to start supply of a DC voltage;
the connection changeover part is configured to connect the AC power supply unit and the diagnosis circuit in accordance with the instruction by the control circuit; and
the diagnosis circuit is configured to be supplied with a DC voltage by the connected AC power supply unit, make a diagnosis of a status of the AC power supply unit, and give a notification of a result of the diagnosis to the control circuit,
the power supply control method comprising stopping supply of a DC voltage by the AC power supply unit after instructing the external redundant power supply device to start supply of a DC voltage.

7. The power supply control method according to claim 6, comprising diagnosing a status of the AC power supply unit after instructing the external redundant power supply device to start supply of a DC voltage.

8. A non-transitory computer-readable medium storing a program comprising instructions for causing a server device to perform operations including stopping supply of a DC voltage by an AC power supply unit after instructing an external power supply device to start supply of a DC voltage, the server device having the AC power supply unit having a function as an AC/DC conversion unit, the AC power supply unit being configured to convert an AC voltage received from an outside power supply to a DC voltage and output the DC voltage and a connector connected with an external redundant power supply device and configured to receive supply of a DC voltage outputted from the redundant power supply device, the redundant power supply device including a plurality of power supply units each having a function as an AC/DC conversion unit and converting an AC voltage received from the outside power supply to a DC voltage and outputting the DC voltage, the server device running at a DC voltage supplied by at least one of the AC power supply unit and the redundant power supply device connected via the connector, the server device further comprising:

a control circuit configured to execute control on the external redundant power supply device so as to supply a DC voltage;

a diagnosis circuit configured to diagnose a status of the AC power supply unit; and a connection changeover part configured to change a destination of supply of a DC voltage outputted by the AC power supply unit to the diagnosis circuit, wherein:

the control circuit is configured to issue to the connection changeover part an instruction to connect the AC power supply unit and the diagnosis circuit, after instructing the external redundant power supply device to start supply of a DC voltage;

the connection changeover part is configured to connect the AC power supply unit and the diagnosis circuit in accordance with the instruction by the control circuit; and the diagnosis circuit is configured to be supplied with a DC voltage by the connected AC power supply unit, make a diagnosis of a status of the AC power supply unit, and give a notification of a result of the diagnosis to the control circuit.

\* \* \* \* \*